United States Patent Office 3,767,732
Patented Oct. 23, 1973

3,767,732
POLYOLS CONTAINING HALOGEN AND PHOSPHORUS, AND PROCESS FOR MAKING THEM
Werner Klose, Knapsack, near Cologne, Germany, assignor to Knapsack Aktiengesellschaft, Knapsack, near Cologne, Germany
No Drawing. Filed July 15, 1971, Ser. No. 163,098
Claims priority, application Germany, July 23, 1970,
P 20 36 595.1
Int. Cl. C07f 9/02, 9/08
U.S. Cl. 260—928    4 Claims

ABSTRACT OF THE DISCLOSURE

The invention provides phosphorus and halogen-containing polyols of General Formula I

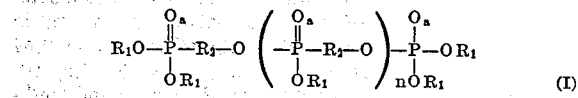    (I)

in which $a$ stands for 1 or 0 and 1, $n$ stands for a number between 0 and 4, $R_1$ stands for at least one halogenated hydrocarbon radical and at least one hydroxylated radical of General Formula II

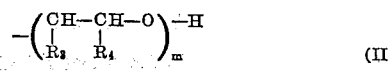    (II)

and $R_2$ stands for a radical of General Formula III

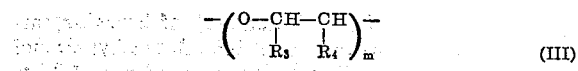    (III)

the substituents $R_3$ and $R_4$, respectively, in Formulae II and III standing for a hydrogen atom or a hydrocarbon radical having from 1 to 6 carbon atoms and being halogen-substituted, if desired, and $m$ stands for a number between 1 and 10.

---

The present invention relates to polyols containing halogen and phosphorus and to a process for making them, the polyols being based on mixed polymeric phosphoric acid esters, of which the ester groups are halogenated or hydroxylated and in which the phosphoric acid groups are linked together by means of hydrocarbon radicals that in turn may be halogenated.

The manufacture of orthophosphoric acid triesters, of which the ester group has a halogen atom or a hydroxyl radical substituent attached thereto, has been described earlier in U.S. Pat. 3,256,240, wherein orthophosphoric acid is subjected to condensation with an epichlorhydrin, for example as shown by the following reaction equation:

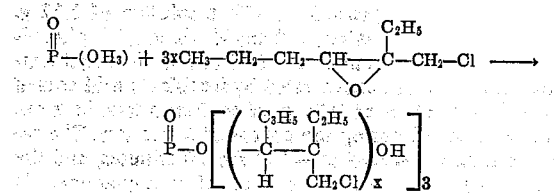

While the compounds having the above composition may be employed as flameproofing agents, for example, the fact remains that this is a commercially unattractive procedure in view of the very costly epoxide compound which is required to be used as a starting material.

It is accordingly an object of the present invention to provide inexpensive polyols containing halogen and phosphorus on the basis of mixed polymeric phosphoric acid esters, of which the ester groups are halogenated or hydroxylated and in which the phosphoric acid groups are linked together by means of hydrocarbon radicals that in turn may be halogenated.

The polyols of the present invention, which have not been described heretofore, have the following General Formula I:

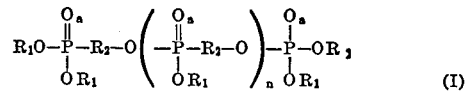    (I)

in which $a$ stands for 1 or 0 and 1, $n$ stands for a number of between 0 and 4, $R_1$ stands for at least one halogenated hydrocarbon radical and at least one hydroxylated radical of General Formula II

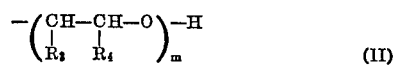    (II)

and $R_2$ stands for a radical of General Formula III

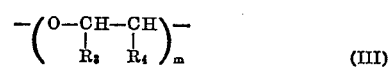    (III)

the substituents $R_3$ and $R_4$, respectively, in Formulae II and III standing for a hydrogen atom or a hydrocarbon radical having from 1 to 6 carbon atoms and being halogen-substituted, if desired, and $m$ stands for a number of between 1 and 10, preferably 1 and 4. In the above General Formula I, $R_1$ may more particularly stand for an aliphatic or cycloaliphatic radical having one or more halogen atoms, for example a 2-chloroethyl radical or 2,3-dibromopropyl radical, or stands for an aryl radical having at most 8 carbon atoms, whereas $R_3$, $R_4$ stand for a hydrogen atom, a methyl radical or chloromethyl radical.

The polyols of the present invention also comprise mixtures of the products of General Formula I and compounds of General Formula VI

    (VI)

in which $a$ stands for 0 or 1, and $R_1$ stands for a halogenated hydrocarbon radical and/or a hydroxylated radical. The compounds of General Formula VI are obtained as by-products in the manufacture of the polyols of Formula I.

A further object of the present invention is to provide a process for making the phosphorus- and halogen-containing polyols of General Formula I, comprising a first reaction step, wherein a compound of General Formula IV

    (IV)

in which $R_5$ stands for a halogenated hydrocarbon radical and $b$ stands for 0 or 1, is reacted, at a temperature of between 20 and 180° C., over a period of between 0.5 and 5 hours and, if desired, in the presence of a phosphorous acid stabilizer and a disodium phosphate regulator, with a polyphosphoric acid or a mixture thereof with $P_2O_5$ so as to produce a mixture of partially esterified polyphosphoric acids; and a second reaction step, wherein the first step reaction mixture, which may be cooled, if desired, is reacted with an epoxide of General Formula V

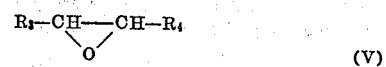    (V)

in which $R_3$, $R_4$ stand for a hydrogen atom or a hydrocarbon radical having from 1 to 6 carbon atoms and being halogenated, if desired, so as to oxalkylate the free acid groups of the partially esterified polyphosphoric acids with the resultant formation of a polyol of Formula I above.

As already mentioned earlier herein, the product mixture of Formula I obtained by the process of the present invention also contains compounds of General Formula VI

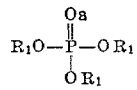

(VI)

in which $a$ stands for 0 or 1, and $R_1$ stands for a halogenated hydrocarbon radical and/or a hydroxylated radical.

The starting material used in carrying out the process of the present invention preferably is a compound of General Formula IV, in which the substituent $R_5$ stands for an aliphatic or cycloaliphatic radical having one or more halogen substituents, or stands for an aryl radical having at most 8 carbon atoms and one or more halogen substituents, $R_5$ may more particularly stand for a chloroethyl radical or 2,3-dibromopropyl radical. Tris-2-chloroethyl phosphate or tris-2-chloroethyl phosphite, for example, are very useful starting materials for practical purposes.

In the process of the present invention, the phosphorous acid stabilizer is intended to avoid thermal change of the resulting polyol, so as to obtain it as a colorless product. The phosphorous acid should conveniently be added to the starting material at a rate of between about 0.1 and 2 weight percent, based on the final product. The disodium phosphate is effective in the second step reaction only, in which it effects a fairly complete reaction of the epoxide with the intermediary product obtained in the first step reaction. Optimum conversion rates are obtained by using the reaction mixture in combination with between about 0.1 and 2 weight percent of disodium phosphate, based on the intermediary product of the first step reaction.

In the epoxide reaction component of Formula V above, the substituents $R_3$, $R_4$ preferably stand for a hydrogen atom, a methyl or chloromethyl radical. The useful reaction components include ethylene oxide, propylene oxide or epichlorhydrin, for example. The acid groups react substantially completely with the epoxide if use is made of a temperature of between about 60 and 120° C., in the second step reaction. Following completion of the reaction, unreacted epoxide is expelled from the reaction mixture, for example by means of nitrogen at a temperature of between about 80 and 120° C.

The following statements are intended further to illustrate the present invention.

The products obtained in the first step reaction of the present process generally comprise mixtures of various esters of polyphosphoric acids which present different degrees of condensation and are in equilibrium with each other. This can be established by determining the isolated or terminal and middle $PO_4$-groups by nuclear magnetic resonance spectroscopy.

In principle, the process of the present invention is an esterification or oxalkylation reaction which, however, takes an unexpected course. This in view of the fact that the oxalkylation of the free acid groups of the partially esterified polyphosphoric acids does not terminate the reaction, which unexpectedly and additionally effects the incorporation of the Formula-III-radical into the

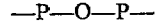

fundamental frame. This incorporation can be interpreted to the effect that the hydroxylated ester group of the polyphosphoric acid ester effects alcoholysis of the

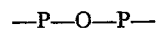

frame as illustrated by the following general reaction equation:

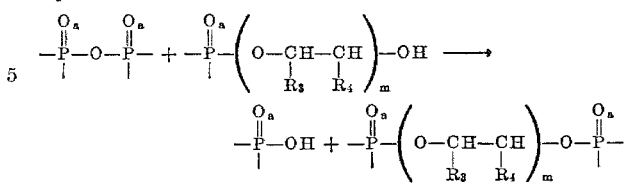

The structural element of the formula:

which is formed upon alcoholysis, is oxalkylated anew by epoxide present in the reaction mixture.

The products obtained by the process of the present invention are of commercial interest, for example for flame-proofing combustible substances. For example, the products of the present invention may be condensed with an equivalent portion of at least one organic isocyanate compound to produce fire resistant polyurethanes. Such polyurethanes can be produced as foams and find use as, for example, heat and sound insulation. The condensation can be initiated by conventional activators such as tertiary amines and/or organotin compounds. Foams can be prepared by adding customary expanding or blowing agents such as chlorofluoroalkanes and/or water. Suitable isocyanate compounds are 2,4- or 2,6-toluylene-diisocyanate. Further details for converting the polyols of this invention to fire resistant polyurethanes can be found in copending application Ser. No. 146,785, filed on May 25, 1971 in the names of Joachim Wortmann, Franz-Josef Dany and Joachim Kandler and entitled "Difficulty Inflammable Polyurethanes and Process for Making Them," which application is incorporated herein by reference. The process itself permits the manufacture of a wide variety of polyols, with respect to their constitution. By an appropriate selection of the quantitative ratios and nature of the starting components for use in the first step reaction, it is possible to vary both the ratio of halogen - substituted/hydroxyl - substituted ester groups, and the mean chain length of the resulting final product. Further possibilities of variation reside in the use of mixtures of various phosphoric acid esters, and in the use of mixtures of phosphoric acid and phosphorous acid esters, and various epoxides. In other words, the present process is very flexible and therefore permits the manufacture of products having predetermined and specific properties satisfying widespread commercial specifications.

EXAMPLE 1

A reactor fitted with agitator, thermometer, gas inlet and reflux condenser was charged first with 2,950 grams of tris-2-chloroethyl phosphate (10.3 mols) and 294 grams of phosphorus pentoxide (2.06 mols) and 349 grams of polyphosphoric acid containing 84 weight percent of $P_2O_5$ (1.03 mols) were successively added thereto with the exclusion of air and moisture and while maintaining a temperature of 25° C. The mixture was heated to 60° C. and the $P_2O_5$ present therein was dissolved. Following the addition of 32 grams of $H_3PO_3$ and 10 grams of $Na_2HPO_4$, the whole was heated to 90° C. and maintained at that temperature for 3 hours. Following this, ethylene oxide was introduced into the mixture at a temperature of between 60 and 80° C. until the oxalkylation was complete. This was indicated by strong reflux of material in the condenser charged with methanol and Dry Ice. Ethylene oxide in excess was expelled from the reaction mixture by means of nitrogen at 90° C. and 4,608 grams of an almost colorless liquid, which had a density of $D_4^{20}=1.44$ grams/cubic centimeter, were obtained. The product contained 29.5 weight percent of $P_2O_5$, 23.7 weight percent of chlorine and had a hydroxyl number of 114 milligrams of KOH/gram and an acid number of 2.5 milligrams of KOH/gram.

EXAMPLE 2

A mixture of 1,863 grams of tris-2-chloroethyl phosphate (6.5 mols), 737 grams of polyphosphoric acid (84 weight percent of $P_2O_5$; 2.17 mols), 26 grams of phosphorous acid and 8 grams of $Na_2HPO_4$ was heated for 1 hour to 152° C. in the reactor described in Example 1, and successively cooled down to 80° C. Ethylene oxide was introduced at that temperature into the reaction mixture until strong reflux commenced to occur. Unreacted ethylene oxide was expelled from the reaction mixture by means of nitrogen at 90° C. and 4,426 grams of a slightly yellowish liquid, which had a density of $D_4^{20}=$ 1.35 grams/cubic centimeter, contained 24.8 weight percent of $P_2O_5$ and 15.5 weight percent of chlorine, and had a hydroxyl number of 212 milligrams of KOH/gram, were obtained.

EXAMPLE 3

A mixture of 190 grams of tris-2-chloroethyl phosphate (0.67 mol), 113 grams of polyphosphoric acid (84 weight percent of $P_2O_5$; 0.33 mol), 3 grams of phosphorous acid and 0.9 grams of $Na_2HPO_4$ was heated for one hour to 150° C., in a manner analogous to that described in Example 1. Following this, the mixture was cooled down to 50° C. and 289 grams of propylene oxide were dropped thereinto over 3 hours. Unreacted propylene oxide in excess was expelled and 581 grams of a slightly yellowish liquid, which contained 25.2 weight percent of $P_2O_5$ and 11.3 weight percent of chlorine and had a hydroxyl number of 224 milligrams of KOH/gram, were obtained.

EXAMPLE 4

404 grams of tris-2-chloroethyl phosphite (1.5 mols), 169 grams of polyphosphoric acid containing 84 weight percent of $P_2O_5$ (0.5 mol) and 2 grams of $Na_2HPO_4$ were mixed at 60° C. in the reactor described in Example 1 and heated for 1 hour to 90–95° C. The resulting mixture was allowed to cool down to 60° C. and ethylene oxide was introduced thereinto until strong reflux commenced to occur, and unreacted epoxide was expelled at 90° C. by means of nitrogen. 768 grams of a slightly colored liquid, which contained 25.2 weight percent of $P_2O_5$ and 11.3 weight percent of chlorine and had a hydroxyl number of 146 milligrams of KOH/gram, were obtained.

EXAMPLE 5

The reactor was the same as that used in Example 1, and 105 grams of tris-(2,3-dibromopropyl)-phosphate were mixed therein with 51 grams of polyphosphoric acid (84 weight percent of $P_2O_5$) while adding 0.7 gram of $H_3PO_3$ and the whole was heated for 1 hour to 90° C. The mixture was allowed to cool down to 30° C. and 86 grams of tris-(2-chloroethyl)-phosphate, 0.6 gram of $H_3PO_3$ and 0.6 gram of $Na_2HPO_4$ were added thereto. Following this, the whole was stirred for 1 hour at 90° C. Ethylene oxide was then introduced thereinto at 60–80° C. until strong reflux indicated the end of the ethylene oxide addition reaction. Ethylene oxide in excess was expelled by means of nitrogen at 80–90° C. and 347 grams of a slightly brownish product were obtained. It contained 21.9 weight percent of $P_2O_5$, 19.5 weight percent of bromine, 9.0 weight percent of chlorine, and had a hydroxyl number of 161 milligrams of KOH/gram.

I claim:

1. Phosphorus and halogen-containing polyols having been obtained by a process comprising a first reaction step, wherein a compound of General Formula IV

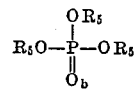

(IV)

in which each $R_5$ stands for a chloroethyl radical or 2,3-dibromopropyl radical and $b$ stands for 0 or 1, is reacted in the presence of between about 0.1 and 2 weight percent by phosphorus acid stabilizer and of between about 0.1 and 2 weight percent of disodium phosphate regulator, the percentages being based on the first step reaction product, at a temperature of between 20 and 180° C., over a period of between about 0.5 and 5 hours with a polyphosphoric acid or mixture thereof with $P_2O_5$ so as to produce a mixture of partially esterified polyphosphoric acids; and a second reaction step, wherein the first step reaction mixture is reacted with an epoxide of General Formula V

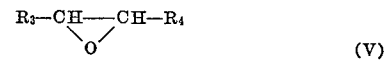

(V)

in which $R_3$, $R_4$ stand for a hydrogen atom or a methyl radical or a chloromethyl radical at a temperature of between 60 and 120° C. so as to completely oxalkylate the free acid groups of the partially esterified polyphosphoric acids with the resultant formation of the phosphorus and halogen-containing polyol.

2. A process for the manufacture of the phosphorus and halogen-containing polyols as claimed in claim 1 which comprises a first reaction step, wherein a compound of General Formula IV

(IV)

in which each $R_5$ stands for a chloroethyl radical or 2,3-dibromopropyl radical and $b$ stands for 0 or 1, is reacted, in the presence of between about 0.1 and 2 weight percent of a phosphorus acid stabilizer and of between about 0.1 and 2 weight percent of a disodium phosphate regulator, the percentages being based on the first step reaction product, at a temperature of between 20 and 180° C., over a period of between about 0.5 and 5 hours with a polyphosphoric acid or a mixture thereof with $P_2O_5$ so as to produce a mixture of partially esterified polyphosphoric acids; and a second reaction step, wherein the first step reaction mixture is reacted with an epoxide of General Formula V

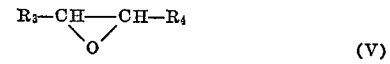

(V)

in which $R_3$, $R_4$ stand for a hydrogen atom or a methyl radical or a chloromethyl radical at a temperature of between 60 and 120° C. so as to completely oxalkylate the free acid groups of the partially esterified polyphosphoric acids with the resultant formation of the phosphorus and halogen-containing polyol.

3. The process as claimed in claim 2, wherein the Formula IV compound is tris-2-chloroethyl phosphate or tris-2-chloroethyl phosphite.

4. The process as claimed in claim 2, wherein the epoxide is ethylene oxide, propylene oxide or epichlorhydrin.

References Cited
UNITED STATES PATENTS

| | | | |
|---|---|---|---|
| 3,159,605 | 12/1964 | Friedman | 260—929 X |
| 3,354,241 | 11/1967 | Larrison | 260—928 X |
| 3,472,919 | 10/1969 | Nagy et al. | 260—929 X |
| 3,423,486 | 1/1969 | Ratz et al. | 260—928 |
| 3,309,427 | 3/1967 | Zech et al. | 260—978 X |
| 3,099,676 | 7/1963 | Lanham | 260—928 |

JOSEPH PAUL BRUST, Primary Examiner

U.S. Cl. X.R.

260—2.5 AJ, 77.5 AR, 929, 978